United States Patent [19]

MacDonald

[11] Patent Number: 5,349,652
[45] Date of Patent: Sep. 20, 1994

[54] SINGLE CHIP INTEGRATED ADDRESS MANAGER WITH ADDRESS TRANSLATING UNIT

[75] Inventor: James R. MacDonald, Austin, Tex.

[73] Assignee: Advanced Micro Devices, Inc., Sunnyvale, Calif.

[21] Appl. No.: 102,113

[22] Filed: Aug. 4, 1993

Related U.S. Application Data

[63] Continuation of Ser. No. 576,605, Aug. 31, 1990, abandoned.

[51] Int. Cl.⁵ .............................................. G06F 12/00
[52] U.S. Cl. ............................. 395/400; 364/DIG. 1; 364/255.7; 364/256.4
[58] Field of Search ... 364/200 MS File, 900 MS File; 395/400, 425

[56] References Cited

U.S. PATENT DOCUMENTS

| | | | |
|---|---|---|---|
| 3,753,232 | 8/1973 | Sporer | 395/425 |
| 4,041,472 | 8/1977 | Shah et al. | 395/325 |
| 4,680,700 | 7/1987 | Hester et al. | 395/400 |
| 4,691,281 | 9/1987 | Furui | 395/400 |
| 4,747,044 | 5/1988 | Schmidt et al. | 395/400 |
| 4,758,951 | 7/1988 | Sznyter, III | 395/400 |
| 4,835,734 | 5/1989 | Kodaira et al. | 395/400 |
| 4,937,735 | 6/1990 | Uehara | 395/400 |
| 4,937,736 | 6/1990 | Chang et al. | 395/400 |
| 4,980,816 | 12/1990 | Fukuzawa et al. | 395/400 |
| 5,018,061 | 5/1991 | Kishigami et al. | 395/400 |
| 5,045,998 | 9/1991 | Begun et al. | 395/325 |
| 5,091,846 | 2/1992 | Sachs et al. | 395/250 |
| 5,091,850 | 2/1992 | Culley | 395/400 |
| 5,123,101 | 6/1992 | Sindhu | 395/400 |
| 5,187,791 | 2/1993 | Baum | 395/725 |

OTHER PUBLICATIONS

Mano, Computer System Architecture, 2nd ed., 1982, pp. 495-521.

Primary Examiner—Joseph L. Dixon
Assistant Examiner—Matthew M. Kim
Attorney, Agent, or Firm—Foley & Lardner

[57] ABSTRACT

An address manager, for use in a memory management system, translates a multiple-bit memory address received from a central processing unit and provides a translated memory address to a memory control unit. The address manager includes an address translation unit including a translation look-up table which translates the memory address to a translated address in accordance with translation parameters stored in the look-up table, and a translation unit control register which provides the address translation unit look-up table with the translation parameters. The address translation unit also includes an alert signal generator which provides the memory control unit with an alert signal when an address is being translated. The central processing unit, the address translation unit, the translation unit control register and the memory control unit are all integrated within a single integrated circuit.

11 Claims, 1 Drawing Sheet

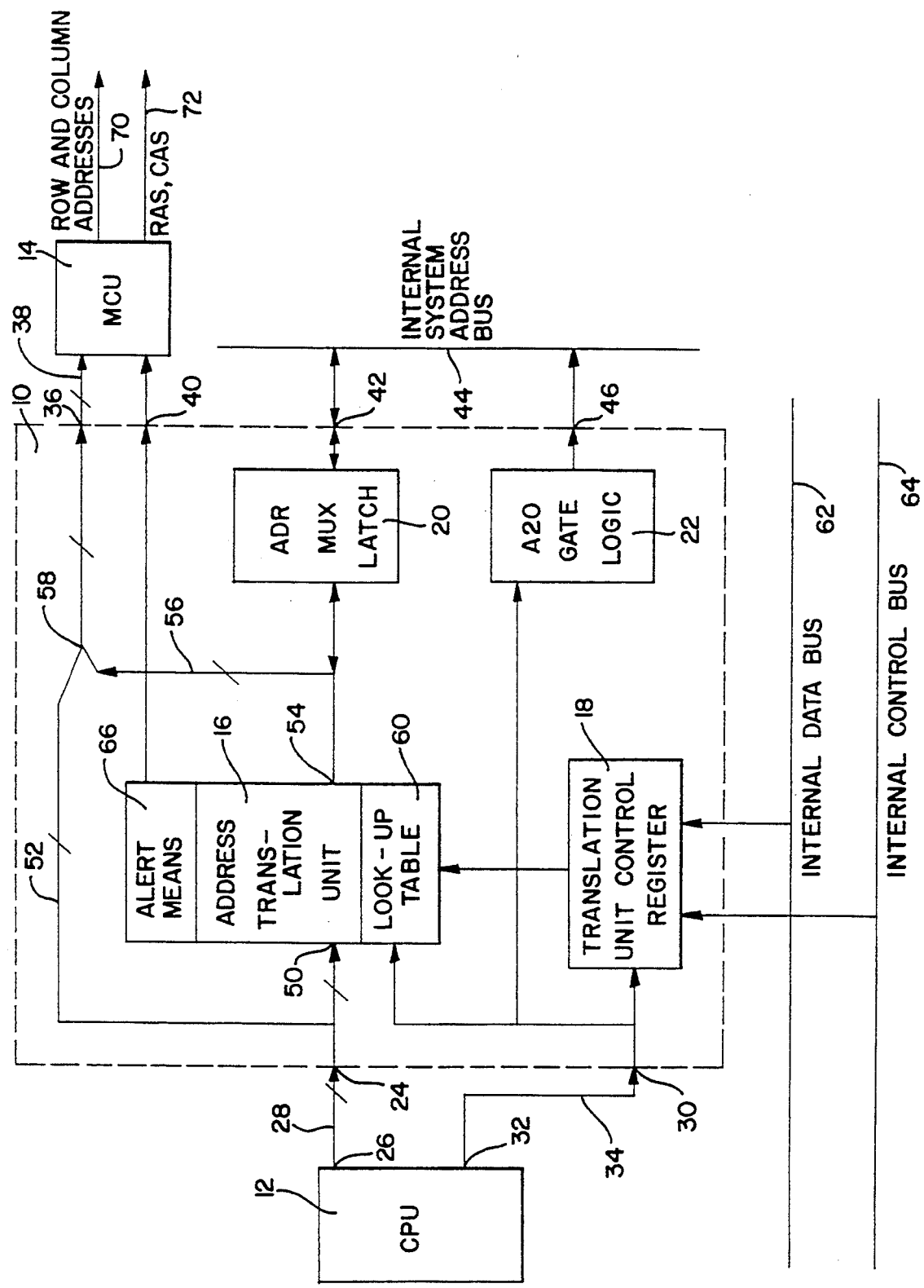

SINGLE CHIP INTEGRATED ADDRESS MANAGER WITH ADDRESS TRANSLATING UNIT

This is a continuation of application Ser. No. 07/576,605 filed Aug. 31, 1990, now abandoned.

BACKGROUND OF THE INVENTION

The present invention generally relates to an address manager for use in a memory management system which translates central processing unit multiple-bit memory addresses to be translated to translated addresses and which conveys the translated addresses to a memory control unit. The present invention more particularly relates to an address manager which is fully integrated within a single integrated circuit device along with its associated central processing unit and memory control unit and which provides an alert signal to the memory control unit upon translating a central processing unit memory address.

Memory systems are well known in the art. Such systems are used in many applications including personal computers. Memory systems provide program and operating data to associated central processing units to enable the central processing units to execute program instructions.

Memory systems, such as those incorporating dynamic random access memory (DRAM) devices generally include one or more memory banks wherein each memory bank is divided into pages of, for example, 16 KB pages. In this case, for example, a 256 KB memory bank will include sixteen pages.

In order to access such memories, central processing units provide a multiple-bit address including a first portion which can be used as an index into a 16 KB memory page and a second portion which can be used to generate memory page pointers. In order to provide proper and organized memory utilization, the central processing unit memory address second portion pointers are translated by an address manager translation unit in accordance with stored translation parameters to provide a translated address including the central processing unit memory address first portion which is not translated and a translated second portion which includes an address of the proper page to be accessed.

The translated address is then conveyed to a memory control unit which acts upon the translated address to derive a memory row and column address within the addressed page and row and column address strobe signals to be applied to the memory bank which includes the addressed page. In this manner, the available memory space is efficiently utilized and organized.

In the prior art, the address managers have been integrated within an integrated circuit device separate from the central processing unit integrated circuit device and separate from the memory control unit integrated circuit device. This has caused serious timing delays in the critical timing path for memory address generation. For example, because the address manager has been separately integrated from the memory control unit, prior art address manager integrated circuits have required large transistor buffers to couple the address manager to the memory control unit. Such buffers, because they conduct large currents, are slow in responding to address signals which must be conveyed between the address manager and the memory control unit. The address manager of the present invention overcomes the need for large transistor buffers between the address manager and the memory control unit because the address manager is fully integrated within a single integrated circuit device along with the central processing unit and the memory control unit.

In such systems, central processing units perform accesses to operating system and program memory with addresses which require the aforementioned translation and accesses to slower memory and peripheral devices with addresses which do not require translation. The first mentioned accesses must be performed quickly since these accesses are required to permit the central processing unit to support the entire system. The second mentioned accesses to access peripheral devices, as for example disk drives and external printers, or slower memory and which do not require address translation, are performed rather slowly compared to the first mentioned memory accesses. To insure proper signal timing, the address manager of the present invention includes an alert means which provides an alert signal when it receives an address from its central processing unit that requires translation The alert signal provided to the memory control unit informs the memory control unit that it is translating an address and that the memory control unit should adjust its timing accordingly for generating the aforementioned row and column addresses and row and column address strobe signals.

SUMMARY OF THE INVENTION

The present invention provides an address manager for use in a memory management system for translating a multiple-bit memory address to be translated and received from a central processing unit and providing a translated memory address to a memory control unit. The address manager includes an input for receiving the multiple-bit memory address, wherein the multiple-bit memory address includes a first portion to remain untranslated and a second portion to be translated and an address translation unit coupled to the input for receiving the memory address second portion. The address translation unit includes a translation look-up table for translating the memory address second portion to a translated address portion in accordance with translation parameters stored in the look-up table. The address manager further includes a translation unit control register coupled to the address translation unit for providing the address translation unit look-up table with the translation parameters, and an output arranged to be coupled to the memory control unit for providing the memory control unit with the translated memory address including the memory address first portion combined with the translated address portion. The central processing unit, address translation unit, translation unit control register, and the memory control unit are all integrated within a single integrated circuit.

The present invention further provides an address manager for use in a memory management system for translating a multiple-bit memory address to be translated and received from a central processing unit and providing a translated memory address to a memory control unit. The address manager includes an input for receiving the multiple-bit memory address, the multiple-bit memory address including a first portion to remain untranslated, and a second portion to be translated including memory page pointers, and an address translation unit coupled to the input for receiving the memory address second portion. The address translation unit includes a translation look-up table for translating the memory address second portion to a translated address portion including a memory page address in accordance with translation parameters stored in the look-up table. The address manager further includes a translation unit control register coupled to the address translation unit for providing the address translation unit look-up table with the translation parameters and an output arranged to be coupled to the memory control unit for providing the memory control unit with the translated memory address including the memory address first portion combined with the translated address portion. The address translation unit further includes alert means arranged to be coupled to the memory control unit and to provide the memory control unit with an alert signal responsive to translating the memory address second portion and wherein the central processing unit, address translation unit, translation unit control register, and the memory control unit are all integrated within a single integrated circuit.

BRIEF DESCRIPTION OF THE DRAWING

FIG. 1: The features of the present invention which are believed to be novel are set forth with particularity in the appended claims. The invention, together with further objects and advantages thereof, may best be understood by making reference to the following description taken in conjunction with the accompanying drawing, in the sole FIGURE (FIG. 1) of which like reference numerals identify identical elements and wherein the sole FIGURE (FIG. 1) illustrates a block diagram of an address manager embodying the present invention in association with a central processing unit and a memory control unit.

DETAILED DESCRIPTION OF THE PREFERRED EMBODIMENT

Referring now to the sole FIGURE, it illustrates an address manager 10 embodying the present invention together with a central processing unit 12, such as an 80286 central processing unit of the type well known in the art, and a memory control unit 14. The address manager 10 generally includes an address translation unit 16, a translation unit control register 18, an address multiplexer latch 20, and an A20 gate logic 22. The address manager 10 further includes a first input 24 which is coupled to the central processing unit output 26 by a central processing unit address bus 28 and a second input 30 which is coupled to a central processing unit control output 32 by a central processing unit control bus 34.

The address manager 10 further includes an output 36 which is coupled to the memory control unit 14 by a memory address bus 38, a memory translation alert output 40 coupled to the memory control unit 14, an internal system address bus output 42 which is coupled to an internal system address bus 44 and an A20 gate logic output 46 which is also coupled to the internal system address bus 44.

The memory address bus 38 may be referred to as a fast bus because it supports memory accesses by the central processing unit 12 for obtaining operating system data and programs to enable the central processing unit 12 to execute instructions for supporting the entire system, such as a personal computer system. The internal system address bus 44, on the other hand, may be referred to as a slow bus, because it is used by the central processing unit 12 for accessing slower memory and non-memory devices such as peripheral devices such as, for example, disk drives or external printers. The central processing unit 12 thus provides at its output 26 multiple-bit memory access addresses and non-memory access addresses. The memory access addresses provided by the central processing unit 12 at its output 26 include a first portion which contain an index into a memory page to be accessed and a second portion which may include pointers which are utilized by the address translation unit 16 for selecting the proper memory page to be addressed. Hence, memory access addresses may, and generally do, require translation by the address translation unit 16 and, more specifically, the second portion of the memory access address generally requires such translation.

The translation unit 16 includes an input 50 for receiving the second portion of the central processing unit memory access address. The first portion of the central processing unit memory address portion is carried by an internal multiple-bit bus 52. The translated second portion of the memory address is conveyed from an output 54 of the translation unit 16 over another bus 56 where at 58 the untranslated first portion and the translated second portion are combined to form the translated memory access address to be conveyed from output 36 over the memory address bus 38 and to the memory control unit 14.

The address translation unit 16 translates the central processing unit memory address second portion in accordance with translation parameters stored within a look-up table 60. The look-up table is a store which stores memory page pointers with corresponding memory page addresses. Hence, when the translation unit 16 translates a central processing unit memory address, it obtains a memory page address from the look-up table which corresponds to the memory page pointers contained within the central processing unit memory address second portion.

The look-up table 60 is coupled to the translation unit control register 18 which is in turn coupled to an internal data bus 62 and an internal control bus 64. The translation unit control register 18 receives the translation parameters from the internal data bus 62 and is enabled for reading the translation data from the bus 62 by enable signals carried over the internal control bus 64. Upon receiving the translation parameters and upon receiving enable signals from the central processing unit over the central processing unit control bus 34, the translation unit control register 18 conveys the translation parameters into the look-up table 60.

As will also be noted in the FIGURE, the address translation unit 16 further includes an alert means 66. The alert means 66 is coupled to the output 40 which in turn is coupled to the memory control unit 14. The alert means 66 is arranged to provide an alert signal to the memory control unit 14 in response to the address translation unit 16 translating a central processing unit memory address. The alert means signal is provided to cause the memory control unit to adjust its timing.

When the memory control unit 14 receives a translated address over the memory address bus 38, it derives a row and column address for the memory page being addressed and row and column address strobe signals to enable the proper memory bank to be addressed. The memory control unit provides the row and column addresses over a bus 70 and the row and column address strobe signals over a bus 72.

The alert signal provided by the alert means 66 informs the memory control unit 14 that the translation unit 16 is translating an address and that the memory control unit 14 will be receiving the translated address from the translation unit 16. The memory control unit 14 can then adjust its timing to accommodate the translated memory address and to provide the row and column addresses in proper timing relation to the row and column address strobe signals.

The control output 32 of the central processing unit 12 is also coupled to the translation unit 16. The central processing unit 12 at its output 32 provides information over the central processing unit control bus 34 as to the type of cycle the central processing unit is in. The central processing unit may operate in two different cycles, a memory access cycle, and a non-memory, input/output, access cycle. When the address translation unit 16 receives an address from the central processing unit and also receives from the control output 32 information that the central processing unit is in a memory access, the address translation unit 16 will translate the address presented at its input 50.

Central processing unit addresses which relate to non-memory accesses need not be translated by the address translation unit 16. Such non-memory accesses may be accesses to, for example, peripheral devices such as disk drives or external printers. These addresses, responsive to receiving non-memory access information from the output 32 of the central processing unit 12, are not translated by the address translation unit 16, but instead are passed directly through the address translation unit 16 without translation and transferred to the address multiplexer latch 20 from the translation unit output 54. The address multiplexer latch 20 provides the non-memory address to the internal system address bus 44 and latches the address at its output to maintain that address in a valid state for the duration of the current central processing unit cycle. In addition, the multiplexer latch 20 allows memory accesses via bus 38 by other master devices coupled to the internal system address bus 44. The addresses used by such other master devices are not translated by the translation unit 16.

The A20 gate logic 22 is also coupled to the central processing unit control output 32. It is utilized to provide compatibility with early generation memory systems in a manner well known in the art.

In accordance with the present invention, the address translation unit 16, the translation unit control register 18, the address multiplexer latch 20, the central processing unit 12, and the memory control unit 14 are all integrated within a single integrated circuit device. The A20 gate logic 22 is also preferably integrated within this single integrated circuit device. Because the address manager is fully integrated with the memory control unit 14, the large transistor buffers heretofore required between the address manager and memory control unit may be dispensed with and are thus rendered unnecessary. The reason for this is that since the address manager is integrated with memory control unit, the address manager will have a known load connected to its outputs to thus preclude the need for large transistor buffers. Also, since the address manager 10 is integrated with the central processing unit 12, the propagation delays previously exhibited in systems wherein the address manager was separately integrated are avoided.

While a particular embodiment of the present invention has been shown and described, modifications may be made, and it is therefore intended to cover in the appended claims all such changes and modifications which fall within the true spirit and scope of the invention.

What is claimed is:

1. An address manager for use in a memory management system for receiving from a central processing unit a multiple-bit memory address to be translated and a multiple-bit memory address to remain untranslated and for translating said multiple-bit memory address to be translated and providing a translated memory address to a memory control unit, said address manager comprising:

an input for receiving from said central processing unit said multiple-bit memory address to be translated and said multiple-bit memory address to remain untranslated, said multiple-bit memory address to be translated including a first portion to remain untranslated and a second portion to be translated;

an address translation unit coupled to said input for receiving said second portion to be translated, said address translation unit including a translation look-up table for translating said memory address second portion to be translated to a translated address portion in accordance with translation parameters stored in said look-up table and an alert means for providing said memory control unit with an alert signal responsive to said address translation unit receiving said portion to be translated for causing said memory control unit to adjust its timing to accommodate the translation of said portion to be translated;

a translation unit control register coupled to said address translation unit for providing said address translation unit look-up table with said translation parameters;

an output for providing said memory control unit with said translated memory address including said first portion to remain untranslated combined with said translated address portion, and an address latch coupled to said address translation unit, said address translation unit conveying said multiple-bit address to remain untranslated to said address latch without translation, said address latch for latching said multiple-bit address to remain untranslated;

said central processing unit, said address translation unit, said translation unit control register, said address latch, and said memory control unit all being integrated within a single integrated circuit.

2. The address manager as defined in claim 1 wherein said address translation unit is arranged to use said second portion to be translated to said multiple-bit memory address to be translated as memory page pointers and for translating said second portion to be translated to said translated address portion including a memory page address.

3. The address manager as defined in claim 1 wherein said memory management system includes a memory address bus coupling said address manager to said memory control unit, and wherein said address translation unit is coupled directly to said memory address bus.

4. The address manager as defined in claim 1 wherein said system includes a data bus and wherein said translation unit control register is coupled to said data bus for receiving said translation parameters from said data bus.

5. The address manager as defined in claim 4 wherein said system includes a control bus and wherein said translation unit control register is coupled to said control bus for receiving enabling signals from said control bus for enabling said provision of said translation parameters to said address translation unit.

6. The address manager as defined in claim 1 wherein said central processing unit is arranged to provide multiple-bit addresses for memory access cycles and input and output cycles, wherein said central processing unit includes a control output to provide cycle type signals indicating the type of cycle for which said central processing unit provides each multiple-bit address, and wherein said control output is coupled to said address translation input.

7. An address manager as defined in claim 6 wherein said address translation unit is arranged, responsive to said central processing unit control signals, to translate only said central processing unit multiple-bit address corresponding to memory access cycles.

8. An address manager as defined in claim 7 wherein said translation unit control register is also coupled to said central processing unit control output.

9. The address manager as defined in claim 1 wherein said address latch is coupled to an internal system address bus for providing said multiple-bit address to remain untranslated to said internal system address bus.

10. The address manager as defined in claim 1 wherein said address latch is coupled to an internal system address bus and to said output for providing internal system addresses to said output.

11. The address manager as defined in claim 10 wherein said address latch provides said internal system addresses to said output without translation.

* * * * *